United States Patent
Casteel et al.

(10) Patent No.: US 8,423,160 B2
(45) Date of Patent: Apr. 16, 2013

(54) SYSTEMS AND METHODS FOR CONTROLLING ELECTRONIC CIRCUITRY WITH SEPARATED CONTROLLERS

(75) Inventors: Jordan Brantley Casteel, Roanoke, VA (US); William Robert Pearson, Roanoke, CA (US); Mark Eugene Shepard, Roanoke, VA (US); John Andrew Leonard, Roanoke, VA (US); Douglas Gregg Fowley, Roanoke, VA (US); John Robert Booth, Hardy, VA (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 12/712,973

(22) Filed: Feb. 25, 2010

(65) Prior Publication Data

US 2011/0204857 A1    Aug. 25, 2011

(51) Int. Cl.
*G05B 11/01* (2006.01)

(52) U.S. Cl.
USPC ............... 700/20; 713/322; 375/257; 322/59

(58) Field of Classification Search ............ 700/19, 700/20; 713/322; 375/257; 322/59
See application file for complete search history.

(56) References Cited

U.S. PATENT DOCUMENTS

| | | | |
|---|---|---|---|
| 4,825,406 A * | 4/1989 | Bean et al. | 710/38 |
| 6,037,857 A * | 3/2000 | Behrens et al. | 375/257 |
| 6,292,379 B1 | 9/2001 | Edevold et al. | |
| 6,374,309 B1 * | 4/2002 | Morita et al. | 710/1 |
| 6,484,126 B1 * | 11/2002 | Brown et al. | 702/184 |
| 7,324,360 B2 | 1/2008 | Ritter et al. | |
| 7,430,624 B2 * | 9/2008 | Gloekler et al. | 710/65 |
| 7,433,213 B2 | 10/2008 | Casteel et al. | |
| 7,711,875 B2 * | 5/2010 | Gloekler et al. | 710/65 |
| 2002/0070716 A1 * | 6/2002 | Gupta et al. | 322/59 |
| 2003/0036806 A1 | 2/2003 | Schienbein et al. | |
| 2005/0036253 A1 | 2/2005 | Tian et al. | |
| 2007/0079025 A1 * | 4/2007 | Gloekler et al. | 710/58 |
| 2008/0133800 A1 * | 6/2008 | Gloekler et al. | 710/61 |
| 2009/0045782 A1 | 2/2009 | Datta et al. | |
| 2009/0204831 A1 * | 8/2009 | Cousson et al. | 713/322 |
| 2009/0323731 A1 * | 12/2009 | Lee et al. | 370/536 |

OTHER PUBLICATIONS

Ruggles, Gary; "Meeting the High-Speed Serial Link Challenge," D&R Industry Articles; printed Dec. 22, 2009; http://www.design-reuse.com/articles/?id=14333.
European Search Report issued in connection with EP Patent Application No. 11155331.9, Nov. 16, 2011.

\* cited by examiner

*Primary Examiner* — Mohammad Ali
*Assistant Examiner* — Anthony Whittington
(74) *Attorney, Agent, or Firm* — Sutherland Asbill & Brennan LLP

(57) ABSTRACT

Embodiments provide systems and methods for controlling electronic circuitry. A system can include at least a first controller and a second controller and at least one power electronic circuitry module. The first controller can be in electrical communication with the power electronic circuitry module via a first high-speed serial link (HSSL). The second controller can be in electrical communication with the power electronic circuitry module via a second HSSL.

18 Claims, 7 Drawing Sheets

SYSTEMS AND METHODS FOR CONTROLLING ELECTRONIC CIRCUITRY WITH SEPARATED CONTROLLERS

FIELD OF THE INVENTION

Embodiments of the invention relate generally to electronic controllers, and more specifically relate to systems and methods for controlling electronic circuitry with separated controllers.

BACKGROUND OF THE INVENTION

In conventional power conversion systems, controllers are typically closely coupled with the corresponding power converter circuitry due to the number of input/output (I/O) connections necessary for system control and protection. This close coupling can restrict the ability to reuse components independently in various system architectures. This in turn reduces usage volume of the components and constrains incremental and major enhancements to individual power conversion components. The close coupling also creates electrical issues, such as conduction of electrical noise (EMI), ambient noise issues, and increases the potential for hazardous events, such as excessive heat, arc flashing, and fire from the converter circuitry to the controller.

It is, therefore, desirable to provide systems and methods for controlling electronic circuitry with separated controllers.

BRIEF DESCRIPTION OF THE INVENTION

Embodiments of the invention can address some or all of the needs addressed above. According to one embodiment, a system for controlling electronic circuitry is provided. The system can include at least a first controller and a second controller and at least one power electronic circuitry module. The first controller can be in electrical communication with the power electronic circuitry module via a first high-speed serial link (HSSL). The second controller can be in electrical communication with the power electronic circuitry module via a second HSSL.

According to another embodiment, a method for controlling electronic circuitry is provided. The method can include providing at least a first controller and a second controller and providing at least one power electronic circuitry module in electrical communication with the first controller and the second controller via a first high-speed serial link and a second HSSL, respectively. The method can further include transmitting serial communications between the first controller and the power electronic circuitry module via the first HSSL and transmitting serial communications between the second controller and the power electronic circuitry module via the second HSSL.

According to yet another embodiment, a system for controlling electronic circuitry is provided. The system can include a controller in operable electrical communication with a exciter electronic circuitry via a high-speed serial link.

Other embodiments, aspects, and features will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE INVENTION

Illustrative embodiments of the invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the systems and methods described herein provide a flexible control architecture for use in power conversion systems. Example power conversion systems may include, but are not limited to, generator exciters, static starters, or motor drives. Flexibility is achieved, in part, by separating the controller component(s) from the power conversion electronics and circuitry component(s). Separation is accomplished, in part, by providing one or more high-speed serial links (HSSL) for communicating between the controller component(s) and the power conversion electronics and circuitry component(s). The HSSL(s) and respective interfaces permit simplex control of one or more power electronic circuitry modules by a single controller, as well as redundant and/or distributed control by multiple controllers.

Using a HSSL communication link and associated interfaces providing HSSL protocol allows implementing a standard processor having a normalized or standardized I/O interface across varied product applications, installations, and/or system architectures. Separable control architecture using HSSL communication also simplifies the ability to retrofit power electronic circuitry modules with new controllers, as well as the ability to make architecture enhancements independently or in a phased manner. Moreover, HSSL protocol provide simplified communications hardware having fewer components and, therefore, reduce costs of implementation and modification.

Additionally, providing HSSL communication links between controllers and power electronic circuitry modules allows physical separation therebetween at distances much greater than previous parallel communications interfaces. Separation increases safety for operators and convenience associated with control rooms by eliminating the need to locate controllers in the immediate proximity of the power conversion electronics being controlled. These and other benefits will be apparent in light of the descriptions of example embodiments provided herein.

Figure 1:
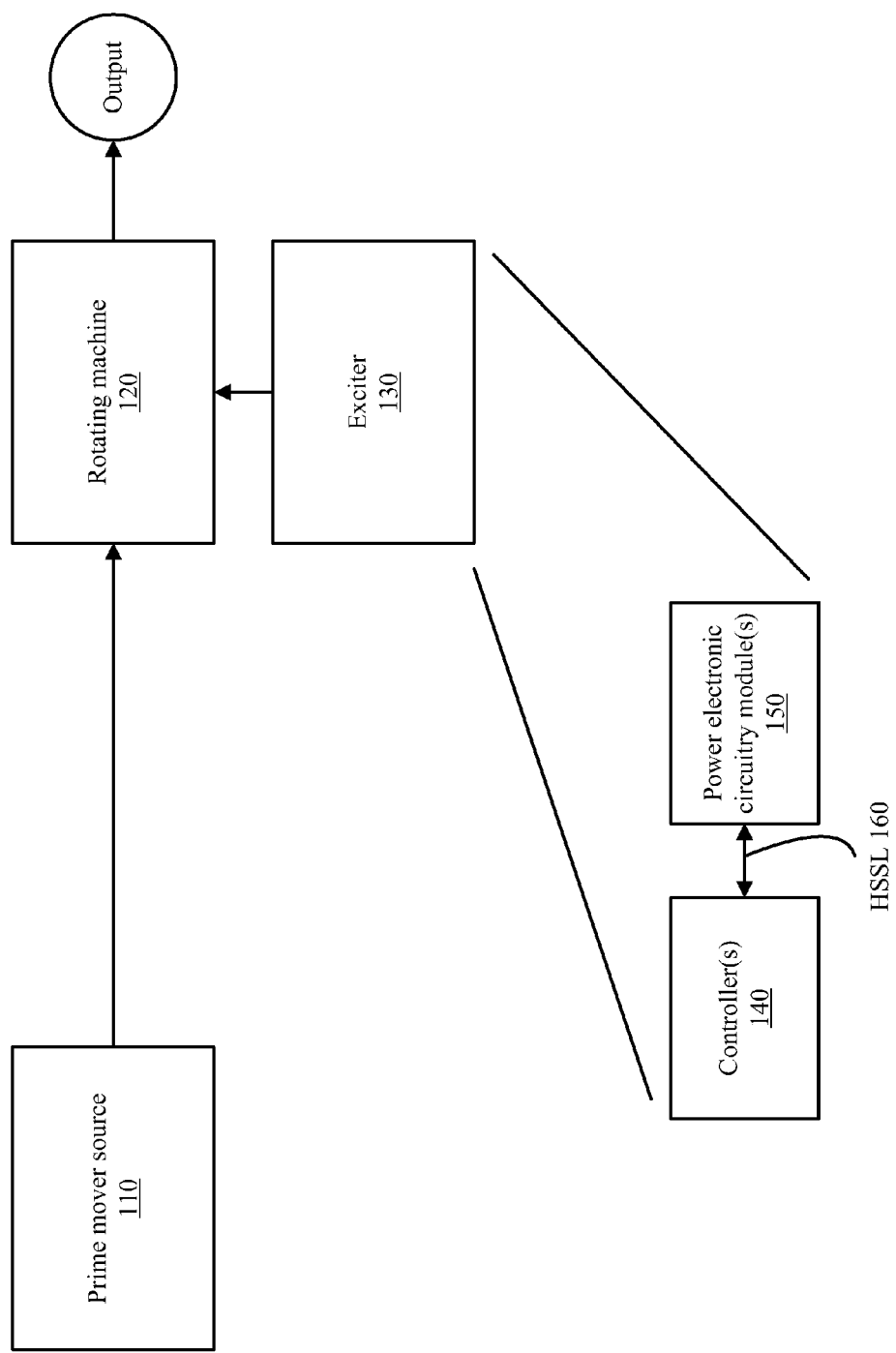
FIG. 1 is a block diagram representation of a plant, according to one example embodiment.

FIG. 1 illustrates a block diagram of an example system 100 (e.g., a power plant or other environment) in which systems for controlling electronic circuitry according to the various embodiments described herein may be implemented. For example, the system 100 represents a simplified power plant having a prime mover source 110 (e.g., hydro, wind, gas, steam, nuclear, etc.) providing mechanical energy to rotating machinery 120 (e.g., a generator, etc.), which is controlled by an exciter 130 (e.g., a field exciter, etc.). FIG. 1 shows that the exciter 130 includes one or more controllers 140 and one or more power electronic circuitry modules 150, such as are known for controlling power to the field of the rotating machinery 120. The controller(s) 140 are in communication with the power electronic circuitry modules 150 via one or more HSSLs 160 and respective interfaces that are programmed to communicate via HSSL protocol (referred to generally and interchangeably herein as "HSSL" and "HSSL interface"), which permits increased separation between the power electronic circuitry module 150 and the controller 140.

According to one embodiment, a HSSL and associated interface may be implemented by each controller 140 being programmed to convert parallel communications to serial communications via a HSSL protocol, which permits communicating serially to one or more power electronic circuitry modules 150 (or other components) using a HSSL. The controller 140 may include a microcontroller or a field-programmable gate array (FPGA) programmed accordingly. Similarly, each power electronic circuitry module 150 is programmed (e.g., via a microcontroller or a FPGA, etc.) to convert the HSSL serial communications to parallel communications for further operations by the power electronic circuitry module 150.

In contrast to the HSSL 160 described herein, conventional exciters (or other electronic circuitry control components) communicated via parallel communication interfaces, which requires a large number of communication lines and ports in close proximity between the components. However, the HSSL 160 protocol, according to various embodiments, allows high-speed bi-directional data communication that is real-time, deterministic, low jittering, and reconfigurable to occur over greater distances. A HSSL 160 and respective interfaces can also be configured to implement forward error correction and cyclic redundancy check (CRC) error detection (or other hash function detection means), which is beneficial in electrically noisy (e.g., high EMI) environments.

According to various embodiments, a HSSL interface 160 can be implemented in either a field programmable gate array (FPGA), a microcontroller, or other programmable hardware, firmware, and/or software, and use Ethernet-type hardware for the communication link. Example communication links may include, but are not limited to, a twisted pair cable or a fiber optic pair cable. In other embodiments, however, instead of Ethernet-type hardware, a HSSL 160 may use any other communication hardware, including, but not limited to, a controller-area network or CAN bus, an Inter-integrated Circuit (i2c) bus, a peripheral component interconnect (PCI) bus, and the like.

In one embodiment, a HSSL 160 and its associated interfaces are configured as a high-speed communication link that is fully duplexed and operable to communicate at speeds of up to 100 Mbits/second. Though, in other embodiments, a HSSL 160 may be operable to communicate at speeds less than, or greater than, 100 Mbits/second, such that the transmission speed is considered "high-speed" relative to other known transmission protocols. For example, in other embodiments, a HSSL 160 may be operable to communicate at speeds greater than 10 Mbits/second, for example, greater than 30 Mbits/second or greater than 50 Mbits/second. It is appreciated, however, that these transmission speeds are illustrative and not intended to be limiting, and that certain advancements not yet known may improve these transmission speeds.

Figure 2:
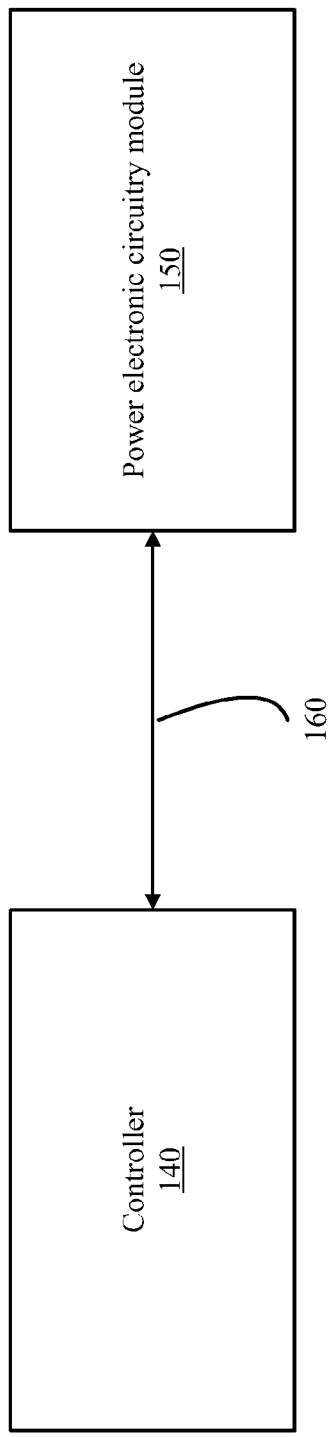
FIG. 2 is a schematic representation of a control system, according to one example embodiment.

As described in more detail with reference to FIGS. 2-6, the controller and power electronic circuitry of the exciter 130 can be implemented in a number of different architectures, each providing unique benefits and operation in an overall system 100 architecture. For example, FIG. 2 shows one embodiment of controller and power electronic circuitry configured in a simplex configuration, in which a single controller 140 is in communication with a single power electronic circuitry module 150 via one or more HSSLs 160. In this example, the controller 140 is configured as a HSSL host and the power electronic circuitry module 150 is configured as the HSSL target for transmitting communications therebetween.

Figure 3:
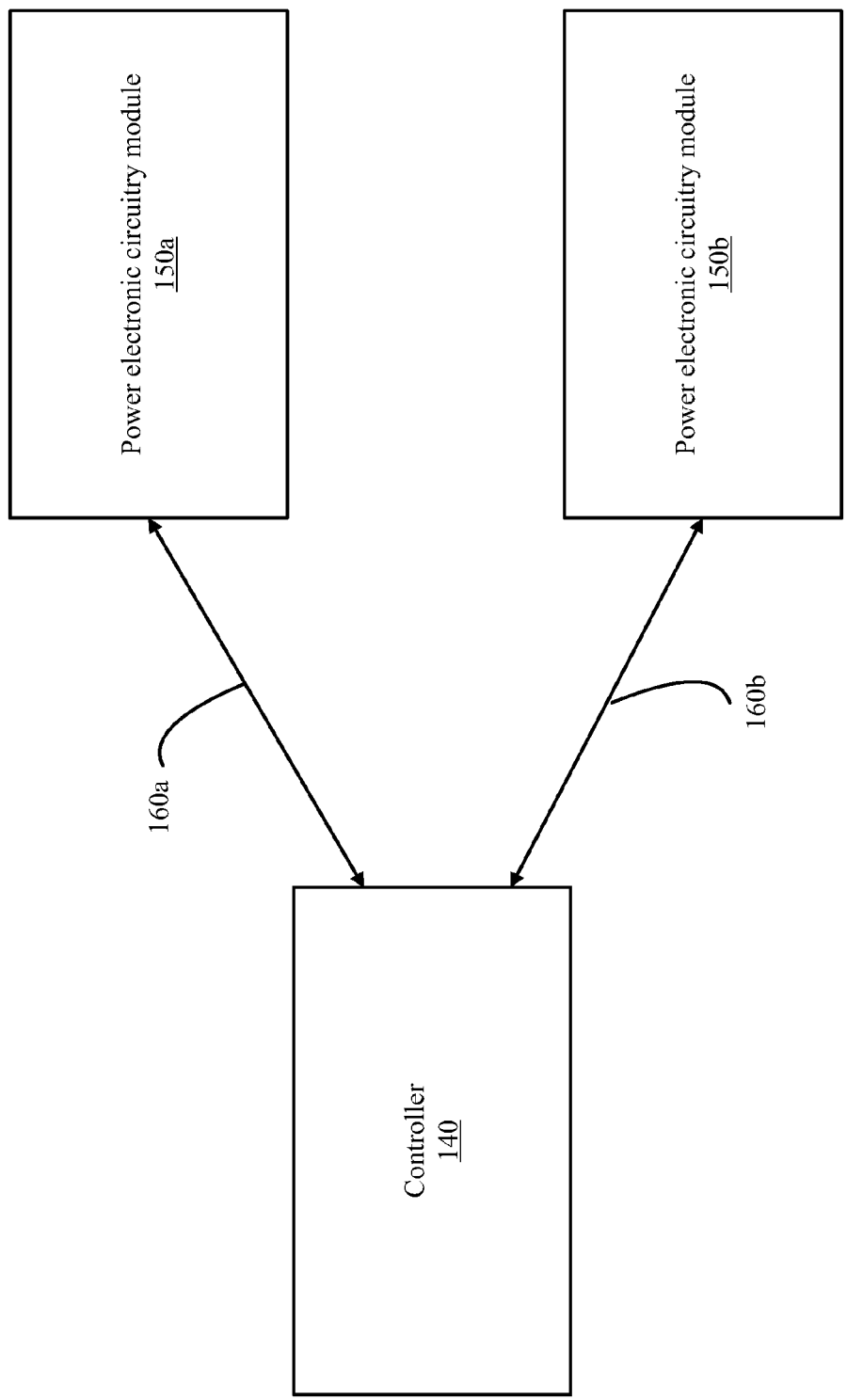
FIG. 3 is a schematic representation of a control system, according to one example embodiment.

Another simplex configuration is illustrated in FIG. 3, in which a single controller 140 is in communication with a first single power electronic circuitry module 150a and a second power electronic circuitry module 150b via a first HSSL 160a and a second HSSL 160b. According to this embodiment, the controller 140 is configured as the HSSL host and each of the first and second power electronic circuitry modules 150a, 150b are configured as targets. The first and second power electronic circuitry modules 150a, 150b may be operable to perform the same functions and configured to provide redundant circuitry or increased power rating, or may be operable to perform different functions (e.g., rectifiers, inverters, phase shifting, or other different control profiles for the exciter 130, etc.), according to various embodiments. It is also appreciated that, while FIG. 2 illustrates only two power electronic circuitry modules, in other embodiments, any number of power electronic circuitry modules may be in communication with, and controlled by, a controller via a HSSL. Moreover, while a single HSSL 160 is shown linking the controller 140 with each power electronic circuitry module 150, it is appreciated that, in other embodiments, multiple HSSLs 160 can be provided between a controller host and a single power electronic circuitry module target.

Figure 4:
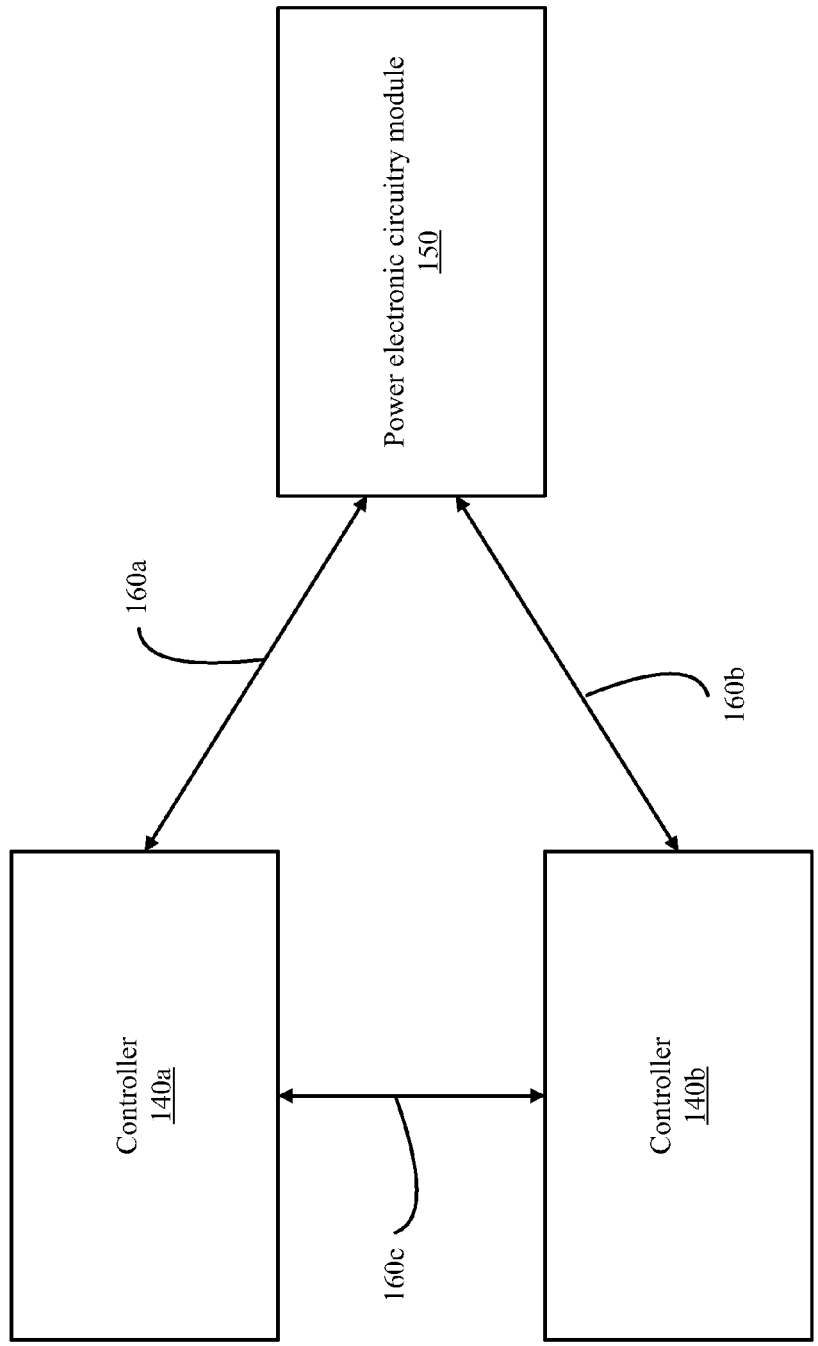
FIG. 4 is a schematic representation of a control system, according to one example embodiment.
Figure 5:
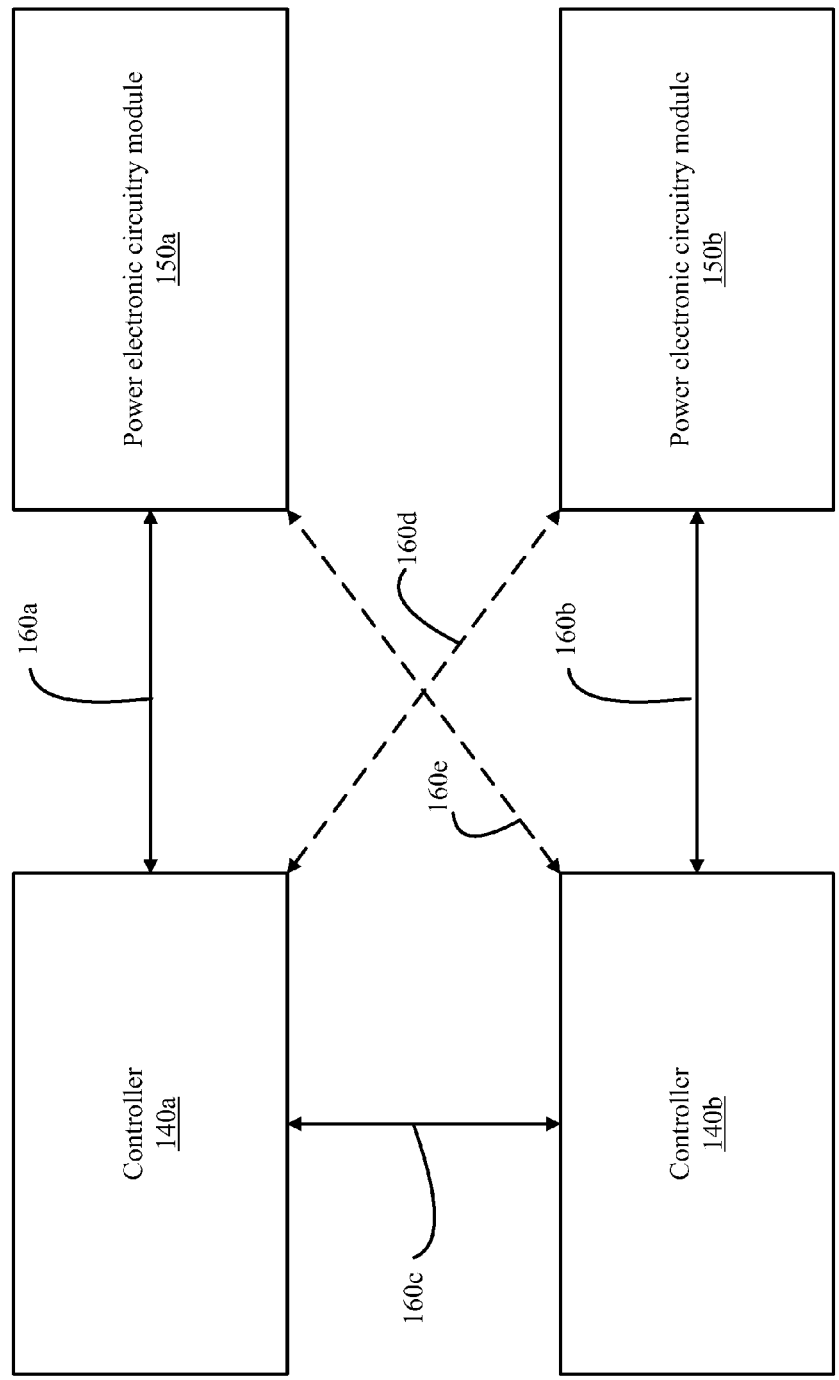
FIG. 5 is a schematic representation of a control system, according to one example embodiment.
Figure 6:
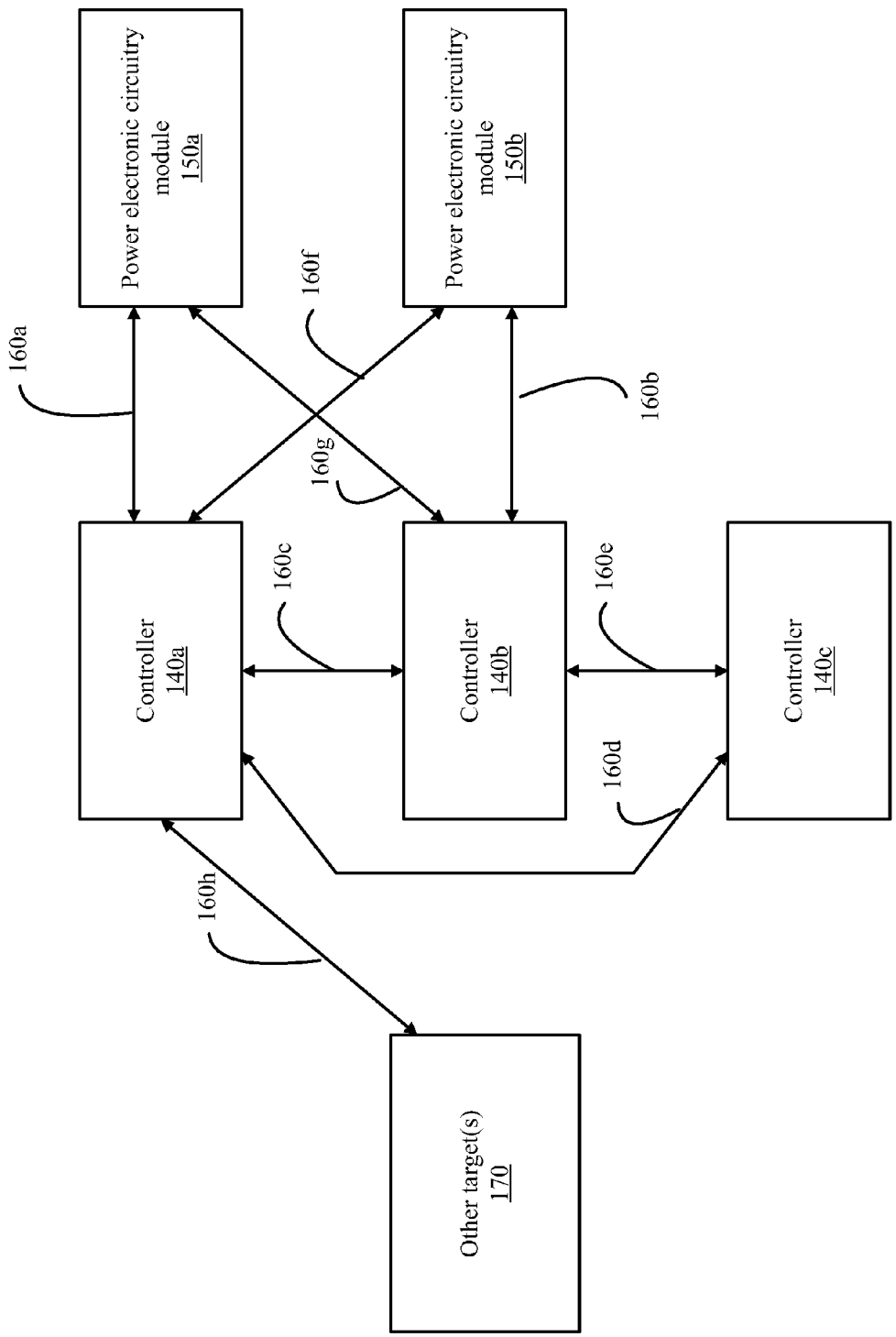
FIG. 6 is a schematic representation of a control system, according to one example embodiment.

FIGS. 4-6 illustrate multiple or complex configurations of controller and power electronic circuitry of an exciter 130. With reference to FIG. 4, according to one embodiment, multiple controllers 140a, 140b are in communication with a single power electronic circuitry module 150 and in communication with each other via a first, second, and third HSSLs 160a, 160b, 160c, respectively. A control system having this configuration allows redundant and/or distributed control of the single power electronic circuitry module 150. In one embodiment, the first and second controllers 140a, 140b and the third HSSL 160c and respective interfaces are configured to receive and transmit operational status and operating data to allow for synchronization therebetween in redundant or distributed configurations. Similarly, the power electronic circuitry module 150 and the HSSLs 160a, 160b and respective interfaces are likewise configured to determine which host controller 140a, 140b is active in a redundant configuration.

According to one embodiment, redundant communications may be achieved by a target module (e.g., electronic circuitry module 150) initially "babbling" to announce its presence to a host controller 140 on an HSSL 160. The host controller 140 responds by establishing bi-directional communications and advancing the electronic circuitry module 150 through a configuration state and ultimately to a system running state. When a target electronic circuitry module 150 is running with multiple host controllers 140 (e.g., host controllers 140a, 140b), determination of the active host controller can be achieved by various methods, such, but not limited to, executing known algorithms within the host controllers and/or the target circuitry, and/or via external selection devices, such as processor-based devices with selection logic executed thereby.

FIG. 5 illustrates another redundant configuration for the controller and power electronic circuitry of the exciter 130, according to one embodiment. In this embodiment, a first controller 140a is in communication with a first power electronic circuitry module 150a via a first HSSL 160a and respective interfaces, and a second controller 140b in communication with a second power electronic circuitry module 150b via a second HSSL 160b and respective interfaces. In addition, the first and second controllers 140a, 140b are in communication with each other via a third HSSL 160c. The third HSSL 160c and associated interfaces permit each controller 140a, 140b to provide redundant control over either or both of the first and second power electronic circuitry modules 150a, 150b, which may themselves be configured for redundant operation with an exciter or for separate operation with an exciter, such as if each module provides a different function.

Also shown in FIG. 5, in one embodiment, a fourth HSSL 160d and a fifth HSSL 160e may optionally be provided, permitting direct communication between the first controller 140a and the second electronic circuitry module 150b via the fourth HSSL 160d, and between the second controller 140b and the first electronic circuitry module 150a via the fifth HSSL 160e, in a manner similar to that described with reference to FIG. 6.

Thus, according to these embodiments, the first controller 140a may be operative to provide primary control to both the first and second power electronic circuitry modules 150a, 150b, or to only control the first power electronic circuitry module 150a. Similarly, the second controller 140a is operable to provide back-up control over the first and second power electronic circuitry modules 150a, 150b, or may provide control only to the second power electronic circuitry module 150b. It is appreciated that any other redundant and/or distributed configurations may be implemented in manners similar to that described with reference to FIG. 5. Moreover, while two controllers and two power electronic circuitry modules are illustrated, in other embodiments there may be additional controllers and/or power electronic circuitry modules.

FIG. 6 illustrates yet another redundant configuration for the controller and power electronic circuitry of the exciter 130, according to one embodiment. This example configuration has the capability of providing triple modular redundant (TMR) control of one or more power electronic circuitry modules. According to this embodiment, the system includes a first controller 140a, a second controller 140b, and a third controller 140c, as well as a first power electronic circuitry module 150a and a second power electronic circuitry module 150b (though, fewer or greater power electronic circuitry modules may be supplied). The first controller 140a and the second controller 140b may be in communication with the first power electronic circuitry module 150a and the second power electronic circuitry module 150b via a first HSSL 160a and a second HSSL 160b, respectively, in the same or similar manner as described with reference to FIG. 5. In addition, each of the first, second, and third controllers 140a, 140b, 140c may be in communication with each other via third, fourth, and fifth HSSLs 160c, 160d, 160e. To facilitate redundant control over the first and second power electronic circuitry modules 150a, 150b, the first controller may be in communication with the second power electronic circuitry module 150b via a sixth HSSL 160f and the second controller may be in communication with the first power electronic circuitry module 150a via a seventh HSSL 160f.

The redundant system configuration illustrated in the embodiment shown in FIG. 6 can provide TMR control over one or more of the power electronic circuitry modules. For example, in the embodiment shown, the third controller 140c is in communication with each of the other controllers 140a, 140b, but not with any of the power electronic circuitry modules 150a, 150b. Thus, the third controller 140c can be operative to serve as the "voter" to review operational status data and provide feedback as to whether one of the three controllers 140a, 140b, 140c is an outlier, which may indicate controller failure. Although TMR is shown in FIG. 6, according to other embodiments, any other n-modular redundancy configuration may be implemented in a similar manner. Moreover, in other embodiments, the third controller 140c may also be in communication with one or more of the power electronic circuitry modules 150a, 150b.

The embodiment of FIG. 6 also illustrates that one or more of the controllers 140a, 140b, 140c may be in communication with one or more other targets 170, which may include, but are not limited to, other control systems, customer I/O components, system I/O components, data logging components, other devices, and the like, via one or more additional HSSLs 160h. Accordingly, the other target(s) 170 may be used to provide input and/or additional control of the controller(a) 140a, 140b, 140c or any other system component, or can receive data from and/or be controlled by the controller(a) 140a, 140b, 140c, according to various embodiments. Although the other target 170 is shown as being in communication with the first controller 140a, it is appreciated that, in other embodiments, additional HSSLs can provide communication with any additional controller or other system component.

It is appreciated that the systems and corresponding configurations and illustrated and described with reference to FIGS. 1-6 are provided for illustrative purposes only, and that many other systems, configurations, and/or number of system components can be provided in a like manner. Moreover, while FIG. 1 illustrates a power conversion system, and controllers and power electronic circuitry associated with an exciter for controlling a rotating machine, similar system configurations have one or more controllers and one or more HSSLs may be used to control other electronic circuitry. Some examples of other circuitry may include, but are not limited to, electronic motor drives, wind turbine controls, or non-power-conversion applications where I/O may be distributed or separated from the controller(s).

Figure 7:
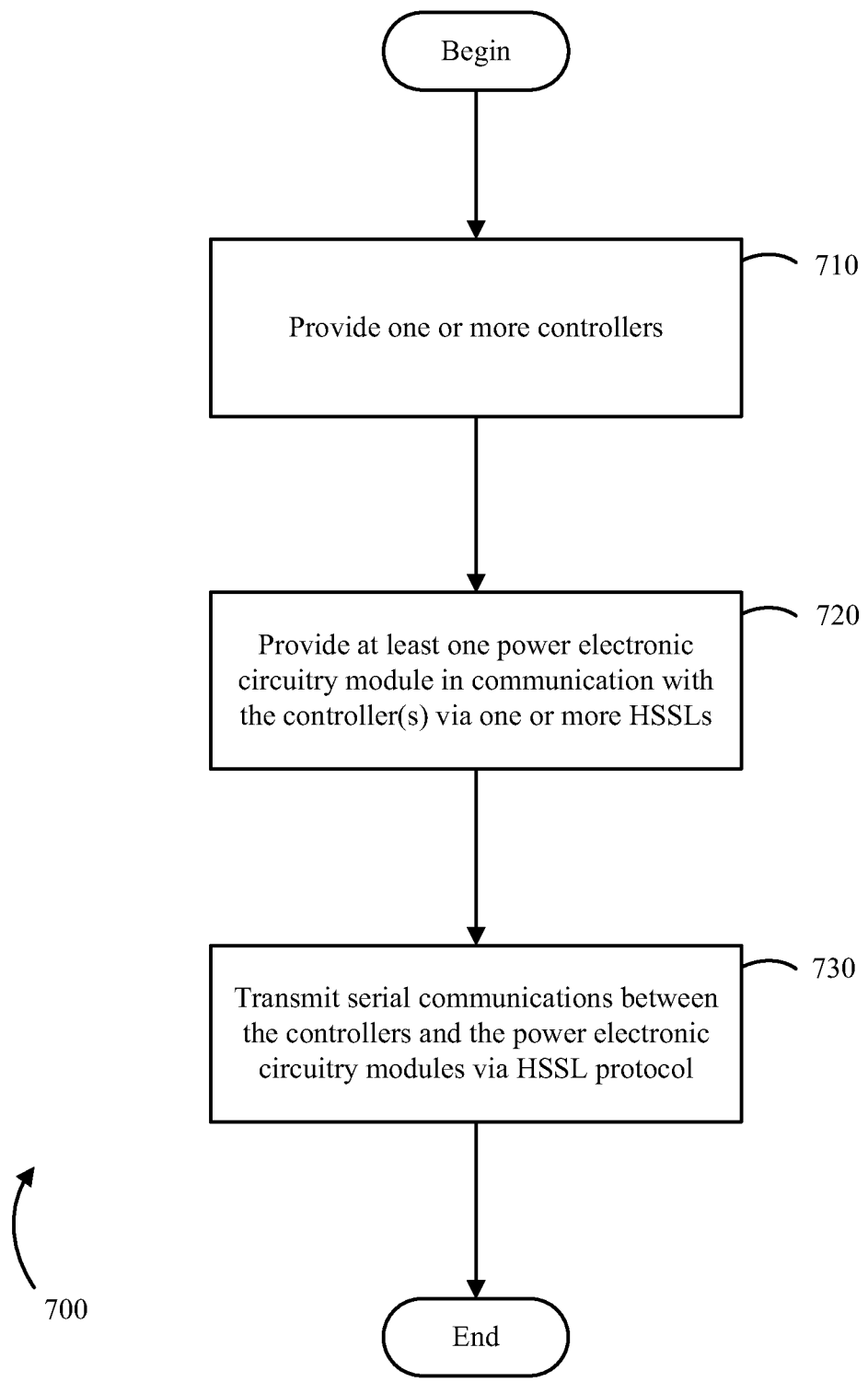
FIG. 7 is a flowchart representation of an example method for controlling electronic circuitry, according to one example embodiment.

FIG. 7 provides a flowchart of an example method 700 for controlling electronic circuitry. At block 710, one or more controllers are provided, such as the controllers 140 described above with reference to FIGS. 2-6. At block 720, one or more power electronic circuitry modules are provided, such as the power electronic circuitry modules 150 described above with reference to FIGS. 2-6. The power electronic circuitry modules are in communication with one or more respective controllers (depending upon the configuration) via one or more HSSLs and respective interfaces. In addition, the controllers and the power electronic circuitry modules may be physically separated, which may be achieved due in part to the implementation of HSSL communication links. Following block 720 is block 730, in which the controllers provide control commands to the power electronic circuitry modules via HSSL protocol over the HSSL communication links and associated interfaces. As part of the control, if the system is provided in a redundant configuration, one aspect of the control commands transmitted at block 730 may include configuration and/or status commands, such as to determine the active host and/or active target devices. In addition, at block 730, the HSSL protocol used includes error correction and detection techniques, such as is known for high-speed serial communications. The method may end after block 730.

Accordingly, various embodiments described herein provide one or more controllers in communication with one or more power electronic circuitry modules via one or more HSSLs. These embodiments provide the technical effects of permitting controllers to be physically separated from circuitry or other components being controlled. These embodiments achieve the additional technical effects of increasing safety, due to the physical separation of the controllers, improving interchangeability of controller and/or circuitry components, due in part to the modularity of the HSSL interfaces, and reducing operating and maintenance costs of control systems. Moreover, controlling an exciter and its electronic circuitry from a distance, and, optionally, using one or more redundant control configurations, improves system reliability and system flexibility.

Many modifications and other embodiments of the exemplary descriptions set forth herein to which these descriptions pertain will come to mind having the benefit of the teachings presented in the foregoing descriptions and the associated drawings. Thus, it will be appreciated the invention may be embodied in many forms and should not be limited to the exemplary embodiments described above. Therefore, it is to be understood that the invention is not to be limited to the specific embodiments disclosed and that the modifications and other embodiments are intended to be included within the scope of the appended claims. Although specific terms are employed herein, they are used in a generic and descriptive sense only and not for purposes of limitation.

The claimed invention is:

1. A system for controlling electronic circuitry in a power conversion system, comprising:
   at least a first controller and a second controller; and
   at least a first power electronic circuitry module and a second power electronic circuitry module;
   wherein the first controller is in electrical communication with the first power electronic circuitry module via a first high-speed serial link (HSSL);
   wherein the second controller is in electrical communication with the second power electronic circuitry module via a second HSSL;
   wherein the first controller and the second controller are in electrical communication with each other via a third HSSL;
   wherein the first controller and the second controller are configured for redundant control of the first power electronic circuitry module and the second power electronic circuitry module; and
   wherein the first controller is in electrical communication with the second power electronic circuitry module via a fourth HSSL and the second controller is in electrical communication with the first power electronic circuitry module via a fifth HSSL.

2. The system of claim 1, wherein the first controller is configured for redundant control of the at least one power electronic circuitry module over the first HSSL and the second controller is configured for redundant control of the at least one power electronic circuitry module over the second HSSL.

3. The system of claim 1, wherein the first controller and the second controller are in electrical communication via a third HSSL.

4. The system of claim 1, wherein the at least one power electronic circuitry module comprises a first power electronic circuitry module and a second power electronic circuitry module; and wherein the first controller is in electrical communication with the first power electronic circuitry module via at least one HSSL and the second controller is in electrical communication with the second power electronic circuitry module via at least one different HSSL.

5. The system of claim 4, wherein the first controller and the second controller are in electrical communication via a third HSSL.

6. The system of claim 5, wherein the first controller and the second controller are configured for redundant control of the first power electronic circuitry module and the second power electronic circuitry module.

7. The system of claim 5, wherein the first controller is in electrical communication with the second power electronic circuitry module via a fourth HSSL and the second controller is in electrical communication with the first power electronic circuitry module via a fifth HSSL.

8. The system of claim 7, wherein the first power electronic circuitry module is configured to provide a first function and the second power electronic circuitry module is configured to provide a second function, wherein the second function is one of: (a) different than the first function; or (b) the same as the first function.

9. The system of claim 7, wherein the first controller and the second controller are each configured to control the first power electronic circuitry module and the second power electronic circuitry module.

10. The system of claim 1, further comprising a third controller in electrical communication with the first controller via a third HSSL and with the second controller via a fourth HSSL, wherein the first controller, the second controller, and the third controller are configured for triple modular redundant control of the at least one power electronic circuitry module.

11. The system of claim 1, wherein each of the first controller and the second controller comprises a microcontroller or a field-programmable gate array (FPGA) configured to convert parallel communications to serial communications via a HSSL protocol for communicating via the first HSSL and the second HSSL, respectively; and wherein the at least one power electronic circuitry module comprises a microcontroller or a FPGA configured to convert the serial communications to parallel communications.

12. A method for controlling electronic circuitry in a power conversion system, comprising:
   providing at least a first controller and a second controller;
   providing at least a first power electronic circuitry module and a second power electronic circuitry module in electrical communication with the first controller and the second controller via a first high-speed serial link (HSSL) and a second HSSL, respectively;
   transmitting serial communications between the first controller and the first power electronic circuitry module via the first HSSL;
   transmitting serial communications between the second controller and the second power electronic circuitry module via the second HSSL;
   transmitting serial communications between the first controller and second controller via a third HSSL, wherein the first controller and the second controller are configured for redundant control of the first power electronic circuitry module and the second power electronic circuitry module, wherein the first controller is in electrical communication with the second power electronic circuitry module via a fourth HSSL, and the second controller is in electrical communication with the first power electronic circuitry module via a fifth HSSL;

transmitting serial communications between the first controller and the second power electronic circuitry module via the fourth HSSL; and transmitting serial communications between the second controller and the first power electronic circuitry module via the fifth HSSL.

13. The method of claim 12, wherein the first controller is configured for redundant control of the at least one power electronic circuitry module via the first HSSL and the second controller is configured for redundant control of the at least one power electronic circuitry module via the second HSSL.

14. The method of claim 12, wherein the first controller is in electrical communication with the second controller via a third HSSL, and further comprising transmitting serial communications between the first controller and the second controller via the third HSSL.

15. The method of claim 12, wherein the at least one power electronic circuitry module comprises a first power electronic circuitry module and a second power electronic circuitry module, and wherein the first controller is in electrical communication with the first power electronic circuitry module via at least one HSSL and the second controller is in electrical communication with the second power electronic circuitry module via at least one different HSSL.

16. The method of claim 15, further comprising controlling the first power electronic circuitry module to provide a first function and controlling the second power electronic circuitry module to provide a second function different than the first function, wherein the second function is one of: (a) different than the first function; or (b) the same as the first function.

17. A system for controlling electronic circuitry, comprising at least a first controller and a second controller; and at least a first power electronic circuitry module of an exciter and a second power electronic circuitry module of the exciter;

wherein the first controller is in electrical communication with the first power electronic circuitry module of the exciter via a first high-speed serial link (HSSL);

wherein the second controller is in electrical communication with the second power electronic circuitry module of the exciter via a second HSSL;

wherein the first controller and the second controller are in electrical communication with each other via a third HSSL;

wherein the first controller and the second controller are configured for redundant control of the first power electronic circuitry module of the exciter and the second power electronic circuitry module of the exciter; and wherein the first controller is in electrical communication with the second power electronic circuitry module of the exciter via a fourth HSSL, and the second controller is in electrical communication with the first power electronic circuitry module of the exciter via a fifth HSSL.

18. The system of claim 17, wherein the controller comprises a first controller and the HSSL comprises a first HSSL, and further comprising a second controller in electrical communication with the power electronic circuitry module of the exciter via a second HSSL, wherein the second controller is in electrical communication with the first controller via a third HSSL, and wherein each of the first controller and the second controller are configured for redundant control of the power electronic circuitry module of the exciter.

* * * * *